Nov. 5, 1963 E. BERLANT 3,109,603

TRANSPORT MECHANISM

Filed Feb. 5, 1962 2 Sheets-Sheet 1

INVENTOR.
EMMANUEL BERLANT

BY Julius L. Rubinstein

ATTORNEY

Nov. 5, 1963

E. BERLANT 3,109,603

TRANSPORT MECHANISM

Filed Feb. 5, 1962

2 Sheets-Sheet 2

INVENTOR.
EMMANUEL BERLANT

BY Julius L. Rubinstein

ATTORNEY

3,109,603
TRANSPORT MECHANISM

Emmanuel Berlant, 3620 Colonial Ave.,
Los Angeles 66, Calif.

Filed Feb. 5, 1962, Ser. No. 170,998
12 Claims. (Cl. 242—55.12)

This invention relates to a transport mechanism and more particularly to a transport mechanism for transporting wire, tape, or film in a recording device.

Wire or tape recorders, or film projectors, and the like, require a transport mechanism which must satisfy a number of requirements. For one thing the transport mechanism must be able to handle the comparatively fragile wire, tape or film without stretching it. In addition, the transport mechanism must be capable of a fast forward and a fast rewind in order to rapidly reposition the tape. Besides this the tape transport mechanism must have the capacity to stop instantly regardless of its speed without causing the wire or tape to overwind. Additionally, in the case of magnetic tape recorders for sound or video reproduction, the tape transport mechanism must be capable of transporting the wire or tape at exactly the same velocity during reproduction as it did during recording.

For optimum fidelity, in the case of magnetic wire or tape recorders, it is desirable to be able to exert a constant optimum tension on the wire or tape as it is drawn past the recording and reproducing heads. This is because the wire or magnetic tape is somewhat elastic, and if the torque exerted on the tape were to vary, it would cause minute elongations and contractions in the tape which would introduce noise or other distortions either into the magnetic field of the tape or into the audio system on play back. In addition, by preventing stretching and contraction, wear and tear on the tape or wire would be minimized so that the tape or wire can be re-used indefinitely without loss of audio or video quality.

Most transport mechanisms employ a capstan for translating the tape or wire in a manner well known in the art. In such mechanisms it is difficult to maintain the tape or wire at the desired optimum tension during use. This is because a constant torque was heretofore applied to the tape take-up reel. This constant torque caused the tension on the tape between the capstan and the tape take-up reel to decrease as the tape diameter increased on the tape take-up reel. Similarly, a constant torque was applied to the supply reel as a drag this caused the tension on the tape between the supply reel and the capstan to increase as the diameter of the tape wound on the supply reel decreased.

In order to prevent a variation in tape tension, the torque applied to the tape take-up reel would have to vary. Recently, as described in U.S. Patent No. 2,954,939 a differential mechanism was used in a tape transport between the tape supply reel and the tape take-up reel. But, transport mechanisms of this type were formed from expensively machined parts and they were not provided with simple and reliable high speed tape advance and tape rewind mechanisms.

Furthermore the tension applied to the tape was manually adjustable and was affected by variations in the powerline voltage. Hence variations in the line voltage or incorrect settings on the manually adjustable tape tension regulator could cause the tape to stretch or produce irregularities in motion.

Many of the better quality tape-driven mechanisms employed a plurality of motors which were combined with mechanical brakes to achieve a smooth, jerk-free, torque transmission with a constant tape tension between the tape supply reel and the tape take-up reel. However the use of such complex equipment made the cost of these tape transports prohibitively expensive for all but professional use. It is apparent that if the number of drive motors and other expensive machined parts could be reduced without adversely affecting the performance or durability of the tape transport the cost of manufacture of a high performance tape transport could be decreased.

What is needed therefore, and comprises one important object of this invention is to provide a low cost tape transport mechanism comprising a single motor in combination with a simple low cost differential mechanism which can automatically maintain the tension in the tape at an optimum valve during operation of the tape transport mechanism and which is capable of high speed forward and tape rewind performance.

This and other objects of this invention will become more apparent when read in the light of the accompanying specifications and drawings wherein.

Figures 1, 4:
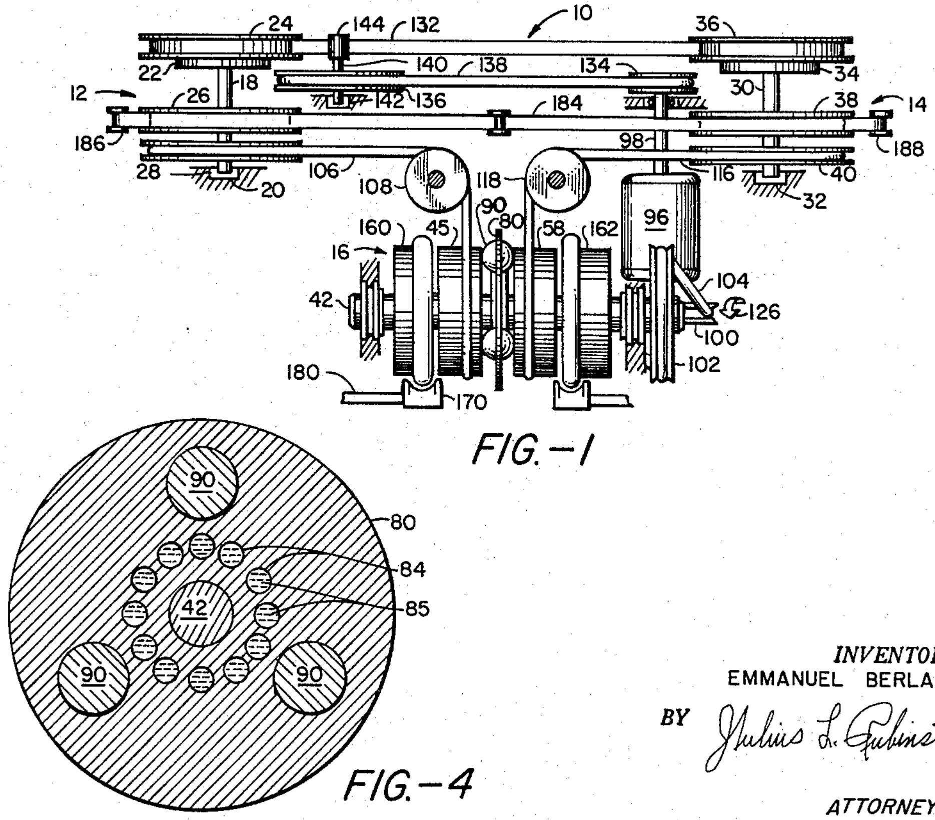
FIG. 1 is a side elevational view of the tape transport mechanism constructed according to the principles of this invention.
FIG. 4 is a sectional view taken on the line 4—4 of FIG. 1.

Referring now to FIG. 1 of the drawing, a tape transport indicated generally by the reference numeral 10 comprises a tape supply mechanism 12, a tape take-up mechanism 14, and a differential transmission 16. The tape supply mechanism in this particular embodiment includes a first shaft 18 rotatably mounted in a fixed support or bearing 20. A tape supply reel support disk 22 for holding a tape supply reel 24 thereon is rigidly secured to shaft 18 adjacent to one end. A brake drum 26 and a sheave 28 are rigidly secured to shaft 18 adjacent its opposite or lower end.

The tape take-up mechanism 14 is like the tape supply mechanism and includes a second shaft 30 rotatably mounted in a support or bearing 32. A tape take-up reel support disk 34 for holding a tape take-up reel 36 thereon is rigidly secured to shaft 30 adjacent one end thereof. A brake drum 38 and a sheave 40 are secured to the opposite or lower end of shaft 30. The tape supply reel 24 is removably keyed to shaft 18, and the tape take-up reel 36 is removably keyed to shaft 30 by any suitable means (not shown), so reel 24 rotates with shaft 18 and the tape take-up reel 36 rotates with shaft 30.

It is understood, however that the specific details of the tape supply mechanism 12 and the tape take-up mechanism 14 described in the specification and shown in the drawings is not essential for the practice of this invention and other structural arrangements are possible and are contemplated.

Figure 3:
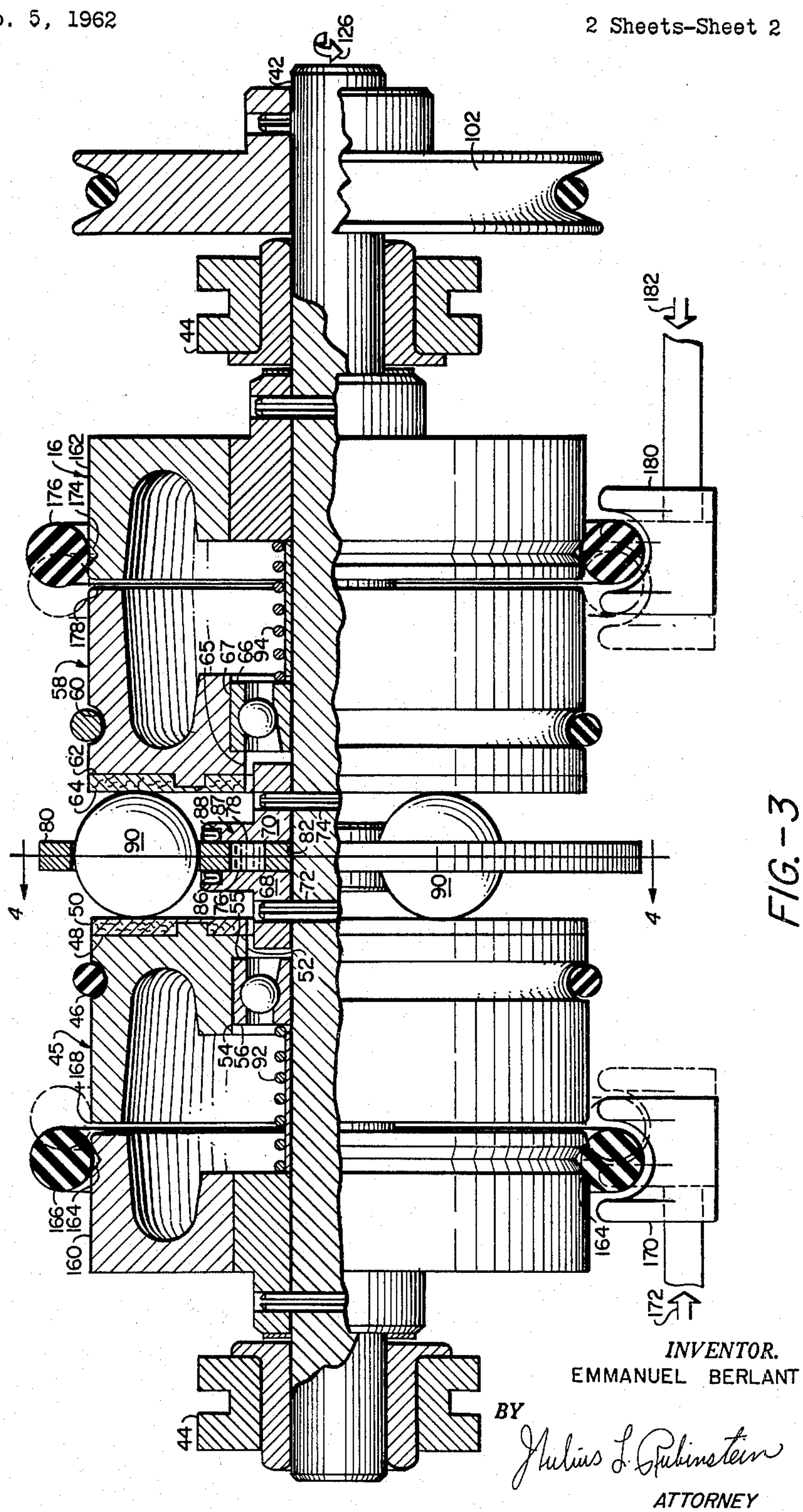
FIG. 3 is a side elevational view partly in section of the differential mechanism in the tape transport.

The differential transmission 16, as best seen in FIG. 3 includes a support shaft 42 rotatably journalled in fixed bearings 44 adjacent each end. A generally cylindrical driving member 45 is provided. The driving member includes a grooved cylindrical surface 46 for receiving a drive belt and a generally planar end wall 48. A friction lining 50 is secured to end wall 48 by any suitable means such as bonding or gluing in a manner well known in the art. Wall 48 is provided with a central shaft receiving bore 52 extending therethrough. Bore 52 is provided with a counter bore 54. Roller bearings 56 are rotatably mounted on support shaft 42 and are seated in counter bore 54 bearing against the base 55 of the counter bore.

The differential transmission 16 includes a driven member 58 which in this particular embodiment is a duplicate of driving member 45. This duplication, although economical and desirable is not essential and circumstances could arise where it might be better to have dissimilar driving and driven members.

Driven member 58 includes a grooved cylindrical surface 60 for receiving a drive belt and a generally planar end wall 62. End wall 62 faces end wall 48 and is in spaced parallel relation with respect thereto. A friction lining 64 is secured or bonded to end wall 62 by any suitable means well known in the art. Wall 62 is provided with a central shaft receiving bore 65 extending therethrough. This bore 65 is provided with a counter bore 67 to provide a seat for roller bearings 66 which are positioned therein. Roller bearings 66 are rotatably mounted on shaft 42 and carry driven member 58 thereon. Hence both the driving member 45 and driven member 58 are freely and rotatably mounted on shaft 42.

First and second drive disks 68 and 70 are pinned to shaft 42 by pins 72 and 74 and are rotatable therewith. Disks 68 and 70 have friction drive surfaces 76 and 78 facing each other in spaced parallel relation with respect thereto. A support disk 80 having a central bore 82 extending therethrough is rotatably mounted on support shaft 42, see FIGS. 3 and 4. Support disk 80 is positioned between drive surfaces 76 and 78 with its opposed surfaces in engagement therewith.

Support disk 80 is provided with a plurality of uniformly angularly spaced openings 84 extending therethrough. These openings are concentric with bore 82 and are preferably filled with a silicone grease 85, see FIG. 4. The grease is retained in the assembly by means of O-rings 86 and 88 mounted in drive disks 68 and 70, see FIG. 3. This structure provides a fluid drive coupling 87. It is understood however that other kinds of couplings such as a magnetic or eddy current slip coupling are possible and are contemplated. Consequently if support shaft 42 is rotated, a rotative force will be exerted on support disk 80. The magnitude of this rotative force or torque in the coupling shown will depend on the viscosity of the grease. Hence the rotational torque of support disk 80 depends on the magnitude and direction of rotative forces exerted on it.

Support disk 80 is a carrier for balls or other rotating elements 90 which are rotatably mounted thereon and which serve as motion transmitting units. In the embodiment shown in the drawings, three balls are mounted in uniformly spaced angular relation in support disk 80 around the axis of support shaft 42, although it is understood that the number of balls is not critical. The drive member 45 and the driven member 58 are biased into engagement with balls 90 by coil springs 92 and 94 mounted on shaft 42, see FIG. 3.

With this arrangement, if the the drive member 45 is rotated on shaft 42, the engagement of drive member 45 with balls 90 cause these balls to rotate in support disk 80. The rotation of these balls exerts a rotative force on the driven member 58 causing it to rotate in a direction opposite to the driving member 45.

If the support disk 80 is caused to rotate on the support shaft 42 and the driving member 45 is rotated in the opposite direction, the engagement of the driving member 45 with balls 90 and the engagement of the balls 90 with the driven member 58 cause the driven member to rotate in a direction opposite to the direction of rotation of the driving member, as described above. With this arrangement the rotational speed of the driven member will be functionally related to the speed of the driving member and augmented or increased by a predetermined amount dependent on the speed of rotation of the support disk. This augmented speed increment depends only on the rotative speed of the support disk 80 and is independent of the speed of the driving member 45. Consequently the output of the driven member 58 is the algebraic sum or resultant of the rotational speed of the driving member 45 and the rotational speed of the support disk 80 to provide planetary differential motion.

The tape transport mechanism 10 is provided with a single electric motor 96 which provides the motive power for all the rotative functions of the tape transport, see FIG. 1. Motor 96 is, in this particular embodiment, provided with a drive shaft 98 extending therethrough. A sheave 100 is rigidly secured to the lower end of the drive shaft 98, and a sheave 102 is rigidly secured to support shaft 42 with a drive belt 104 connected therebetween. With this arrangement, operation of motor 96 causes support shaft 42 to rotate. Although the connection between drive shaft 98 and support shaft 42 utilizes a drive belt and sheaves, the particular kind of driving connection is not critical, and others such as a gearing arrangement, are contemplated.

As best seen in FIG. 1, drive member 45 is connected to sheave 28 on shaft 18 through belt 106. Belt 106 passes under drive member 45 on the grooved surface 46. From there it passes over sheaves 108 and 110. These sheaves are rotatably mounted on shafts secured to fixed bearings 112 and 114. From sheaves 108 and 110, the belt passes to sheave 28, see FIG. 2. Similarly, driven member 58 is connected to sheave 40 on shaft 30 through belt 116. Belt 116 passes under driven member 58 in the grooved surface 60. From there it passes over sheaves 118 and 120. These sheaves are rotatably mounted on shafts secured to fixed bearings 122 and 124. From sheaves 108 and 110 the belt passes to sheave 40, see FIG. 2.

With this arrangement, rotation of the driving member 45 and the driven member 58 would exert a torque on the tape supply reel 24 and the tape take-up reel 36. More particularly, the effect of the rotation of the support shaft 42 in the direction indicated by arrow 126 in FIG. 1 is to exert a torque on support disk 80 through the fluid or friction drive coupling 87. The torque exerted on support disk 80 is transmitted through balls 90 to the driving member 45 and the driven member 58 and is in the direction indicated by arrow 126. This torque is transmitted from the driving member 45 and the driven member 58 to shafts 18 and 30.

Figure 2:
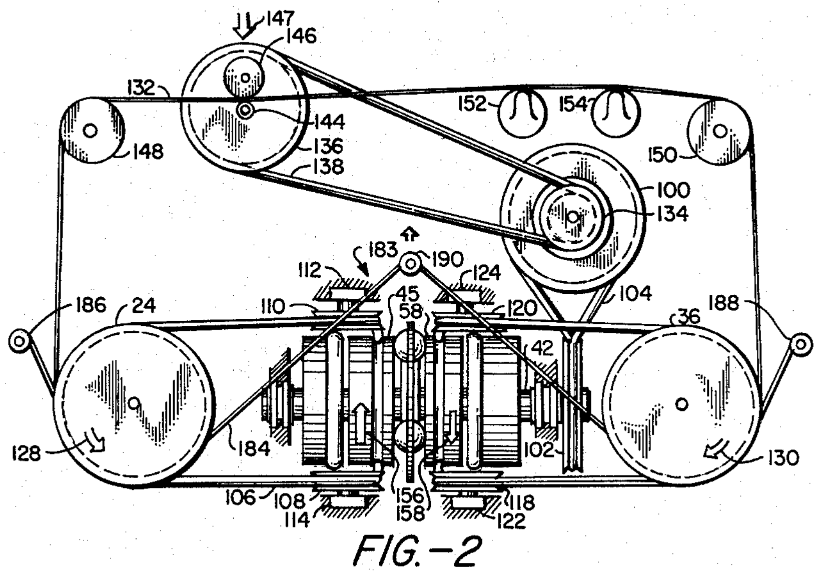
FIG. 2 is a plan view of the tape transport mechanism shown in FIG. 1.

It is noted, however, as indicated by arrows 128 and 130 in FIG. 2 that the torque exerted on shafts 18 and 30 and through them to the tape supply reel 24 and the tape take-up reel 36, is opposite to each other. Consequently, when tape 132 wound on the tape supply reel 24 is connected to the tape take-up reel 36, as shown in FIG. 2, the torque exerted on the tape supply reel 24 and the tape take-up reel 36 pulls the tape in opposite directions. The magnitude of the tension produced in the tape is governed by the viscosity of the grease 85 in coupling 87. Since the tape can withstand only a limited tension without stretching, the coupling 87 must be designed so there is enough slip between shaft 42 and support disk 80 so that the tension exerted on the tape or wire by reels 24 and 36 is less than the tension required to stretch the tape.

It is further noted that although the tension exerted on tape 132 is produced by a torque on the tape supply reel 24 which is opposite to the direction of the torque exerted on reel 32, this arrangement is not critical and if the differential transmission were designed so that the torque exerted on the tape supply reel 24 and the tape take-up reel 36 were in the same direction, the tension on tape 132 could still be obtained by winding the tape on the tape take-up reel in a direction opposite to the way it is wound when the reels 24 and 36 rotate in opposite directions.

As seen in FIG. 1, a sheave 134 is secured to motor drive shaft 98 at the end opposite to sheave 100. Sheave 134 is connected to sheave 136 through belt 138. Sheave 136 is mounted on a shaft 140 rotatably supported by a bearing 142. A capstan 144 is mounted on the upper end of shaft 140 and is rotatable therewith. With this arrangement, operation of the motor 96 causes the capstan to rotate.

A pressure roller 146 is positioned closely adjacent to captan 144 and movable into engagement therewith by means of a solenoid (not shown) acting in the direction indicated by arrow 147, in a manner well known in the art. With this arrangement, when a tape 132 is positioned between capstan 144 and pressure roller 146, as shown in FIG. 2, and the pressure roller is moved against the capstan by means of the solenoid, the rotation of the capstan pulls the tape 132 off the tape supply reel 24.

The tape 132 leaving the tape supply reel 24 passes over guide sheaves 148 and 150 to the tape take-up reel 36. In so doing the tape passes between the capstan 144 and the pressure roller 146 and is operatively associated with the recording head 152 and the playback head 154 in a manner well known in the art.

When tape 132 is pressed between the rotating capstan 144 and pressure roller 146, it is pulled off the tape supply reel 24 causing reel 24 to rotate in a direction opposite to that indicated by arrow 128, in FIG. 2. The rotation of the reel 128 acting through sheave 28 and belt 106 causes driving member 45 to rotate in a direction indicated by arrow 156 in FIG. 2. The engagement of the rotating drive member 45 with balls 90 causes the balls to rotate as described above. The rotation of these balls and their engagement with the driven member 58 causes the driven member 58 to rotate in a direction indicated by arrow 158 in FIG. 2. This direction is the same as the direction of rotation of the support member 80. Consequently the driven member will rotate at a speed which is functionally related to the rotational speed of the driving member, and this speed is augmented by the rotational speed of the support disk 80.

The rotation of the driven member causes the take-up reel 36 to rotate in the direction indicated by arrow 130 in FIG. 2. Since the take-up reel would if free tend to rotate faster than the tape supply reel rotates, due to the effect of the differential mechanism 16, the tape take-up reel 36 will maintain the tape 132 in tension as the tape is moved. In addition, the effect of the slipping action in coupling 87 automatically limits the tension which the take-up reel 36 can exert on the tape, so that this tension is constant and cannot exceed the magnitude of the tension required to stretch the tape despite variations in the line voltage powering motor 96.

The tape transport described so far is economical to manufacture because of the simplicity and the reliability of the parts used. In addition, the tape transport is capable of superior performance despite the use of only one motor for all rotative power because the tape is held at constant tension while the motor is operating, and this is true regardless of whether the tape is stationary or is being moved from the tape supply reel to the tape take-up reel.

However, it is necessary to provide the tape transport 10 with high speed rewind and tape advance capability for rapidly repositioning the tape. As shown in the drawings, this has been done by rigidly securing cylindrical drive members 160 and 162 to shaft 42. Drive member 160 is closely adjacent the driving member 45 and drive member 162 is closely adjacent driven member 58. As seen in FIG. 3 the drive members 160 and 162 have the same diameter as the drive and driven members 45 and 58. Drive member 160 has a circumferential groove 164 which serves as a seat for coupling band 166, see FIG. 3. The adjacent ends of drive member 160 and driving member 45 are beveled to define a second groove 168.

A spring loaded solenoid (not shown) actuates a push member 170 which is in engagement with the coupling band 166. When the solenoid is actuated it exerts a force on the push member 170 in the direction indicated by arrow 172 forcing the coupling band 166 from the solid line position in groove 164 to the dotted line position in groove 168. In this position the drive member 160 and the driving member 45 are coupled together. This causes the driving member 45 to rotate with shaft 42 in the direction indicated by arrow 126. When power to the solenoid is cut off, a spring (not shown) returns the coupling band 166 to its initial solid line position where the drive member 160 and the driving member 45 are decoupled.

The rapid rotation of the driving member 45 acting through belt 106 and sheave 28 causes the tape supply reel 24 to rotate rapidly in the direction indicated by arrow 128 for rapid rewind. At the same time, the rapid rotation of driving member 45 produces a rapid rotation of the driven member 58 in the opposite direction. The speed of rotation of driven member 58 is less than the rotational speed of the driving member 45 because of the rotation of the support disk 80. Hence the tape take-up reel 36 will rotate in a direction opposite to that indicated by arrow 130. Since the effect of the rotation of the support disk 80 is to decrease the rotative speed of the tape take-up reel 36 during tape rewind, the tape take-up reel will exert a drag on the tape 132 maintaining it in constant tension and preventing the tape from overwinding when the fast rewind action is terminated.

Drive member 162 has a circumferential groove 174 which serves as a seat for coupling band 176. The adjacent ends of the drive member 162 and the driven member 58 are beveled to define another belt receiving groove 178, see FIG. 3. A solenoid actuated push member 180 is spring loaded by means of a coil spring (not shown) for automatic reset when power to the solenoid (not shown) is cut off. This push member 180 is in engagement with coupling band 176. When the solenoid driving it is actuated, it exerts a force on push member 180 in direction indicated by arrow 182. This couples drive member 162 and the driven member 58 together so they rotate at high speed with shaft 42 in the direction indicated by arrow 126. The rapid rotation of the driven member 58 causes the tape take-up reel 36 to rotate in the direction indicated by arrow 130.

At the same time, the effect of the differential mechanism is to cause the tape supply reel 24 to rotate in a direction opposite to that indicated by arrow 128, and at a speed which under free conditions would be somewhat less than the rotative speed of the tape take-up reel 36. Consequently the tape supply reel 24 acts as a drag on the tape 132 during rapid tape advance in order to maintain the tape in constant tension and prevent the tape from overwinding when the drive member 162 and the driven member 58 are decoupled.

It is apparent that a conventional control circuit (not shown) would be provided so that whenever the capstan 144 is driving the tape, the coupling bands 166 and 176 are decoupled from the drive member 45 and the driven member 58, and when the driving member 45 or the driven member 58 are coupled to the driving member 160 or 162, the pressure roller 146 must move away from the capstan 144 permitting the tape to freely pass therebetween.

For rapid stopping of the tape during either normal operation of the tape transport, or after rapid forward or rewind, a brake mechanism indicated generally by the reference numeral 183 is provided, see FIG. 2. The brake mechanism includes a brake band 184 which is positioned to engage brake drums 26 and 38 on shafts 18 and 30. The opposite ends of the brake band 184 are secured to fixed supports 186 and 188, as shown in FIG. 2. A spring loaded solenoid (not shown) is attached to the brake band at a point intermediate its ends and is designed to exert a force on the brake band in the direction indicated by arrow 190. This arrangement produces a leading shoe effect between brake band 184 and the brake drums 26 and 38 which effectively, simultaneously and quickly stops the rotation of reels 24 and 36 without the danger of overwind.

The symmetry of the tape transport mechanism indicated in FIG. 1 permits the tape to be driven with equal effectiveness in both directions. Such an arrangement is highly desirable because it permits the tape to be recorded in a plurality of strips or channels on the tape so that the continuous recording length of the tape can be multiplied by the number of recorded channels.

It is apparent that the tape transport described and shown in this specification is composed of simple, easy to manufacture parts, yet the transport is capable of high performance, both from the standpoint of recording fidelity and from the standpoint of durability.

Obviously many modifications and variations in the present invention are possible in the light of the above teachings. It is therefore to be understood, that within the scope of the appended claims the invention can be practiced otherwise than as specifically described.

I claim:

1. A reversible transmission of the class described comprising a support shaft, a driving member and a driven member rotatably mounted on said support shaft, means connecting said driving member and said driven member together so said driven member is rotated at a speed functionally related to the speed of said driving member, driving means associated with said driven member and combining with said driving member for increasing the rotational speed of said driven member by a predetermined amount which is independent of the rotational speed of said driving member, and automatic torque limiting means associated with said driven member for limiting the torque which can be exerted by said driven member.

2. A reversible transmission of the class described comprising a support shaft, a first driving member and a driven member rotatably mounted on said support shaft, means connecting said first driving member and said driven member together, said means comprising a support rotatably mounted on said support shaft between said driving and driven member, at least one motion transmitting unit mounted on said support in spaced relation to said support shaft and in engagement with said driving and driven member whereby the rotation of said first driving member is imparted to said motion transmitting unit which causes said driven member to rotate on said support shaft at a speed related to the rotational speed of said first driving member, driving means connected to said support to cause said support to rotate on said support shaft and function as a planetary coupling so that the speed of said driven member is increased by a predetermined amount which is independent of the speed of said first driving member, and automatic torque limiting means associated with said driven member for limiting the torque which can be exerted by said driven member.

3. A reversible transmission of the class described comprising a support shaft, a driving member and a driven member rotatably mounted on said support shaft, means connecting said driving member and said driven member together, said means comprising a support rotatably mounted on said support shaft between said driving and said driven member, at least one motion transmitting unit mounted on said support in spaced relation to said support shaft and in engagement with said driving and said driven member whereby the rotation of said driving member is imparted to said motion transmitting unit which causes said driven member to rotate on said support shaft at a speed related to the rotational speed of said driving member, driving means connected to said support to cause said support to rotate on said support shaft and function as a planetary coupling so that the speed of said driven member is increased by a predetermined amount which is independent of the speed of said driving member, automatic torque limiting means associated with said driven member for limiting the torque which can be exerted by said driven member, and auxiliary high speed driving means associated with said transmission and selectively movable into engagement with said driving member or said driven member to cause a high speed rotation of said driving member or said driven member.

4. A reversible transmission of the class described comprising a support shaft, a driving member and a driven member rotatably mounted on said support shaft, a planetary coupling, said planetary coupling comprising a support rotatably mounted on said support shaft, rotative elements rotatably mounted in said support and engaging said driving and driven members whereby the rotation of said driving member causes said rotative elements to rotate to cause said driven member to rotate on said support shaft at a speed related to the rotational speed of said driving member, driving means connected to said support to cause said support to rotate whereby the rotational speed of said driven member is increased by a predetermined amount which is independent of the speed of said driving member, and torque limiting means associated with said driven member for limiting the torque which can be exerted by said driven member.

5. A reversible transmission of the class described comprising a support shaft, a driving member and a driven member rotatably mounted on said support shaft, a planetary coupling, said planetary coupling comprising a support rotatably mounted on said support shaft, rotative elements rotatably mounted in said support and engaging said driving and said driven members whereby rotation of said driving member causes said rotative elements to rotate and thereby cause said driven member to rotate on said support shaft at a speed related to the rotational speed of said driving member, driving means connected to said support to cause said support to rotate whereby the rotational speed of said driven member is increased by a predetermined amount which is independent of the speed of said driving member, automatic torque limiting means associated with said driving member for limiting the torque which can be exerted by said driven member, and auxiliary high speed driving means associated with said transmission and selectively movable into engagement with said driving member or said driven member to cause a high speed rotation of said driving member or said driven member.

6. A reversible transmission of the class described comprising in combination a support shaft, means for rotating said support shaft, a driving member and a driven member freely rotatably mounted on said support shaft, a support rotatably mounted on said support shaft, a drive slip connection between said support shaft and said support to cause said support to rotate, motion transmitting units rotatably mounted in said support and carried thereby, means holding said driving member and said driven member in engagement with said motion transmitting units whereby rotation of said driving member in one direction acting through said motion transmitting units causes said driven member to rotate in a direction opposite to said driving member and the rotation of said support causes the rotational speed of said driven member to be increased by a predetermined amount which is independent of the speed of said driving member.

7. A reversible transmission of the class described comprising in combination a support shaft, means for rotating said support shaft, a driving member and a driven member freely rotatably mounted on said support shaft, a support rotatably mounted on said support shaft, a drive slip connection between said support shaft and said support to cause said support to rotate, rotative elements rotatably mounted in said support, means holding said driving member and said driven member in engagement with said rotative elements whereby a rotation of said driving member in one direction causes said rotative elements to rotate and thereby rotate said driven member in a direction opposite to said driving member, and the rotation of said support causes the rotational speed of said driven member to be increased by a predetermined amount which is independent of the speed of said driving member, a first and second drive element rigidly secured to said support shaft and rotatable therewith, said first drive element associated with said drive member and said second drive element associated with said driven member, first means for selectively coupling said first drive element with said drive member and second means for selectively coupling said second drive element with said driven member to cause said driven member or drive member to rotate with said support shaft.

8. A reversible transport mechanism for a tape recorder comprising a tape supply mechanism, a tape take-up mechanism and a differential mechanism, the tape supply mechanism associated with the input of the differential mechanism and the tape take-up mechanism associated with the output of said differential mechanism, a tape drive for actuating the tape supply mechanism constituting one input to the differential mechanism, a second input to the differential mechanism independent of the first input mechanism and augmenting the output of said differential mechanism so that when tape on a tape supply reel connected to the tape supply mechanism is connected to a tape take-up reel connected to the tape take-up mechanism, the augmented output of said differential mechanism causes said tape take-up reel to wind up tape supplied by the tape supply mechanism at a rate sufficient to maintain the tape at a constant tension, and automatic torque limiting means associated with said tape take-up reel so that the tension which the tape is subjected to when it is wound on the tape take-up reel is less than the stretching point of the tape.

9. A reversible transport mechanism for a tape recorder comprising in combination a tape supply mechanism, a tape take-up mechanism, and a differential mechanism, said tape supply mechanism and said tape take-up mechanism including first and second rotatable supports, first and second couplings connecting said first and second rotatable supports to the input and output of said differential mechanism, a first drive source in said differential transmission exerting a rotational force on at least said second rotatable support, and a second drive source associated wtih said first rotatable support causing said first rotatable support to rotate and along with said first drive source drive said differential transmission so that when tape on a tape supply reel mounted on said first rotatable source is connected to a tape take-up reel on said second rotatable support, said first and second drive sources acting on said second rotatable suport through the output of said differential mechanism causes said tape take-up reel to wind up tape supplied by said tape supply reel at a rate sufficient to maintain the tape in tension, and automatic torque limiting means associated with said tape take-up reel so that the tension which the tape is subjected to when it is wound on the tape take-up reel is constant and less than the stretching point of the tape.

10. A reversible tape transport of the class described comprising in combination a tape supply mechanism, a tape take-up mechanism, and a differential transmission, said differential transmission comprising a driving member and a driven member rotatably mounted on a support shaft, a first drive source associated with said driving member and said driven member for exerting a rotational force on said driving member and said driven member, said tape supply mechanism and said tape take-up mechanism including a first rotatable support for holding a tape supply reel, and a second rotatable support for holding a tape take-up reel, a first coupling for connecting said tape supply mechanism with said driving member and a second coupling for connecting said driven member with said tape take-up mechanism in such a way that when tape on a tape supply reel mounted on the first rotatable support is connected to a tape take-up reel on the second rotatable support, the rotational force exerted by said first drive source on said driving member and said driven member is transmitted through said first and second couplings causing the tape supply reel and the tape take-up reel to exert opposing forces on the tape to hold it in tension, a second drive source for driving said tape, said second drive source causing said first rotatable support to rotate at least when tape is connected between the tape supply reel and the tape take-up reel whereby the rotation of said first rotatable support acting through said first coupling causes said driving member to rotate, means connecting said driving member and said driven member together so that said driven member rotates at a speed governed by the first and second drive source, said speed causing said tape take-up reel mounted on the second rotatable support to wind up tape delivered by the tape supply reel at a speed sufficient to maintain the tape in tension, and automatic torque limiting means associated with said tape take-up reel so that the tension which the tape is subjected to when it is wound on the tape take-up reel is constant and less than the stretching point of the tape.

11. A reversible tape transport of the class described comprising in combination a first rotatable support for a tape supply reel, a second rotatable support for a tape take-up reel, and a differential transmission, said differential transmission comprising a support shaft, a driving member and a driven member rotatably mounted on said support shaft, a support member rotatably mounted on said support shaft between said driving member and said driven member, rotative elements mounted in said support member, means biasing said driving member and said driven member into engagement with said rotative elements whereby rotation of said driving member causes said rotative elements to rotate and to exert an opposing rotational force on said driven member so that said driven member rotates in a direction opposite to said driving member, rotating means for causing said support member to rotate in the same direction as the driven member, a first coupling connecting said first rotatable support with said driving member and a second coupling connecting said second rotatable support with said driven member, means for causing said first rotatable support to rotate so that said first coupling causes said driving member to rotate on said support shaft, whereby the rotation of said driving member and said support member combine to cause said driven member and said second rotatable support to rotate, the driving force exerted by said driving member and said support member on said driven member is such that when tape on a tape supply reel mounted on said first rotatable support is connected to a tape take-up reel mounted on said second rotatable support, said tape supply reel rotates at a speed sufficient to cause the tape take-up reel to wind up the tape delivered by the tape supply reel while maintaining the tape in tension, and torque limiting means associated with said tape take-up reel so that the tension which the tape is subjected to when it is wound on the tape take-up reel is constant and less than the stretching point of the tape.

12. A reversible tape transport of the class described comprising in combination a first rotatable support for a tape supply reel, a second rotatable support for a tape take-up reel, and a differential transmission, said differential transmission comprising a support shaft, means for rotating said support shaft, a driving member and a driven member freely rotatably mounted on said support shaft, a support rotatably mounted on said support shaft, a drive slip connection between said support shaft and said support to cause said support to rotate, rotative elements rotatably mounted in said support, means holding said driving member and said driven member in engagement with said rotative elements, a first coupling connecting said first rotatable support with said driving member, and a second coupling connecting said second rotatable support with said driven member, means for causing said first rotatable support to rotate so that said first coupling causes said driving member to rotate on said support shaft whereby the rotation of said driving member in one direction causes said rotative elements to rotate which in turn rotate said driven member in a direction opposite to said driving member and the rotation of said support causes the rotational speed of said driven member to be increased by a predetermined amount which is independent of the speed of said driving member, the driving force exerted by said driving member and said support on said driven member is such that when tape on a tape supply reel mounted on said first rotatable support is connected to a tape take-up reel mounted on said second rotatable support, said tape supply reel driven through said second coupling rotates at a speed sufficient to cause the tape take-up reel to wind up the tape delivered by the tape supply reel while maintaining the tape at a constant tension, and a first and second drive element rigidly secured to said support shaft and rotatable therewith, said first drive element associated with said drive member and said second drive element associated with said driven member, first means for selectively coupling said first drive element with said drive member and second means for selectively coupling said second drive element with said driven member to cause said drive member or said driven member acting through said first and second couplings to rotate said first or second rotatable support to provide a high speed rewind or a high speed tape advance for the tape transport.

References Cited in the file of this patent

UNITED STATES PATENTS 2,782,263 Hoehn et al. ____________ Feb. 19, 1957